United States Patent
Kim et al.

(10) Patent No.: US 12,187,197 B2
(45) Date of Patent: Jan. 7, 2025

(54) VEHICLE DISPLAY DEVICE AND CONTROL METHOD THEREOF

(71) Applicant: LG ELECTRONICS INC., Seoul (KR)

(72) Inventors: Ilwan Kim, Seoul (KR); Jinhyuk Hong, Seoul (KR); Jongtae Park, Seoul (KR); Jaeho Choi, Seoul (KR); Jaeho Lee, Seoul (KR); Byeongjun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 227 days.

(21) Appl. No.: 17/755,623

(22) PCT Filed: Jun. 30, 2020

(86) PCT No.: PCT/KR2020/008493
§ 371 (c)(1),
(2) Date: May 3, 2022

(87) PCT Pub. No.: WO2021/091041
PCT Pub. Date: May 14, 2021

(65) Prior Publication Data

US 2022/0388395 A1      Dec. 8, 2022

Related U.S. Application Data

(60) Provisional application No. 62/931,739, filed on Nov. 6, 2019.

(51) Int. Cl.
*B60R 1/24*      (2022.01)
*B60K 35/00*   (2024.01)
(Continued)

(52) U.S. Cl.
CPC ............... *B60R 1/24* (2022.01); *B60K 35/00* (2013.01); *B60R 11/0229* (2013.01);
(Continued)

(58) Field of Classification Search
None
See application file for complete search history.

(56) References Cited

U.S. PATENT DOCUMENTS

| 10,488,215 | B1 | 11/2019 | Yu | |
|---|---|---|---|---|
| 2009/0240426 | A1* | 9/2009 | Akita | G08G 1/0969 701/533 |

(Continued)

FOREIGN PATENT DOCUMENTS

| JP | 2003307429 | 10/2003 |
|---|---|---|
| JP | 2005-016986 | 1/2005 |

(Continued)

OTHER PUBLICATIONS

PCT International Application No. PCT/KR2020/007753, International Search Report dated Sep. 25, 2020, 12 pages.

(Continued)

*Primary Examiner* — Rebecca A Volentine
(74) *Attorney, Agent, or Firm* — LEE, HONG, DEGERMAN, KANG & WAIMEY

(57) ABSTRACT

The present disclosure relates to a vehicle display device and a control method thereof, the vehicle display device comprising: a display unit; and a control unit that activates a navigation mode for guiding to a destination, and controls the display unit to display a virtual item indicating a driving direction that needs to be changed at a specific display angle when the driving direction needs to be changed within a preset distance on the basis of road information provided in the navigation mode while a vehicle is driving to the destination, wherein the control unit performs a control such (Continued)

that the display angle of the item changes on the basis of the angle of the driving direction that needs to be changed.

9 Claims, 19 Drawing Sheets

(51) Int. Cl.
  *B60K 35/23* (2024.01)
  *B60K 35/28* (2024.01)
  *B60K 35/29* (2024.01)
  *B60K 35/60* (2024.01)
  *B60K 35/81* (2024.01)
  *B60R 11/02* (2006.01)

(52) U.S. Cl.
  CPC ............ *B60K 35/23* (2024.01); *B60K 35/28* (2024.01); *B60K 35/29* (2024.01); *B60K 35/60* (2024.01); *B60K 35/81* (2024.01); *B60K 2360/166* (2024.01); *B60K 2360/1868* (2024.01); *B60K 2360/785* (2024.01); *B60R 2300/205* (2013.01); *B60R 2300/308* (2013.01); *B60R 2300/804* (2013.01); *B60R 2300/8086* (2013.01)

(56) References Cited

U.S. PATENT DOCUMENTS

| | | | |
|---|---|---|---|
| 2010/0131190 A1* | 5/2010 | Terauchi | G01C 21/3658 701/533 |
| 2014/0236473 A1 | 8/2014 | Kondo et al. | |
| 2015/0221220 A1* | 8/2015 | Arai | G06F 16/00 340/907 |
| 2015/0266422 A1 | 9/2015 | Chundrlik, Jr. et al. | |
| 2016/0328619 A1 | 11/2016 | Yi et al. | |
| 2016/0368505 A1 | 12/2016 | Sorstedt et al. | |
| 2017/0025017 A1 | 1/2017 | Thomas et al. | |
| 2017/0039438 A1 | 2/2017 | Homma | |
| 2018/0031384 A1 | 2/2018 | Lee et al. | |
| 2018/0058873 A1 | 3/2018 | Huang | |
| 2018/0283892 A1 | 10/2018 | Behrendt et al. | |
| 2020/0064629 A1* | 2/2020 | Yamashita | G01C 21/36 |
| 2020/0309555 A1 | 10/2020 | Kumon | |
| 2020/0400455 A1 | 12/2020 | Wakayanagi et al. | |
| 2021/0078503 A1 | 3/2021 | Horihata et al. | |
| 2021/0081682 A1 | 3/2021 | Kumano et al. | |
| 2021/0104212 A1 | 4/2021 | Horihata et al. | |

FOREIGN PATENT DOCUMENTS

| | | |
|---|---|---|
| JP | 2011-149835 | 8/2011 |
| JP | 2015004612 | 1/2015 |
| JP | 2015-120395 | 7/2015 |
| JP | 2016057750 | 4/2016 |
| JP | 2016-102735 | 6/2016 |
| KR | 101047719 | 8/2006 |
| KR | 1020090052903 | 5/2009 |
| KR | 1020130136815 | 12/2013 |
| KR | 1020150054022 | 5/2015 |
| KR | 1020170101758 | 9/2017 |

OTHER PUBLICATIONS

PCT International Application No. PCT/KR2020/008493, International Search Report dated Oct. 15, 2020, 11 pages.
United States Patent and Trademark Office U.S. Appl. No. 17/031,277, Office Action dated Jun. 30, 2021, 28 pages.
United States Patent and Trademark Office U.S. Appl. No. 17/031,277, Final Office Action dated Jan. 5, 2022, 26 pages.
Korean Intellectual Property Office Application No. 10-2022-7014707, Office Action dated Nov. 29, 2023, 7 pages.

* cited by examiner (a)

(b)

(c)

(a)

(b)

(c)

VEHICLE DISPLAY DEVICE AND CONTROL METHOD THEREOF

CROSS-REFERENCE TO RELATED APPLICATIONS

This application is the National Stage filing under 35 U.S.C. 371 of International Application No. PCT/KR2020/008493, filed on Jun. 30, 2020, which claims the benefit of U.S. Provisional Application No. 62/931,739, filed on Nov. 6, 2019, the contents of which are all incorporated by reference herein in their entirety.

TECHNICAL FIELD

The present disclosure relates to a vehicle, and more particularly, to a display device for a vehicle providing information related to a currently driven vehicle and method for controlling the same.

BACKGROUND ART

A vehicle is a device that moves in the direction desired by an occupant. A typical example of the vehicle is a car.

For the convenience of users using vehicles, various sensors and electronic devices tend to be installed in the vehicles. In particular, many ongoing efforts are actively made to develop and research Advanced Driver Assistance System (ADAS) for the convenience of user's driving.

In addition, a vehicle is equipped with a navigation system, and information about routes and roads to a desired destination may be provided to a user through the navigation system.

Such a navigation system provides a function of displaying an arrow-shaped indicator indicating a driving direction at a turning point, like a traffic sign.

However, in the case of guidance in a substantially forward direction for straight travel, an arrow is displayed in an almost straight line, which makes it difficult for a user to recognize the actual direction that the user is to take at a turning point.

In addition, when the arrow indicates the direction in which the vehicle is to travel on a road of a curved section, such as a roundabout, the arrow indicates the direction on the basis of the forward straight direction toward the road of the curved section, rather than on the basis of the location of the vehicle, thus confusing the user with regard to the actual driving direction.

DISCLOSURE

Technical Task

The present disclosure is proposed to satisfy the aforementioned necessity or solve the aforementioned problem, and a technical task of the present disclosure is to provide a display device for a vehicle and a control method thereof, which display a virtual item indicating a driving direction of a vehicle, which is traveling to a destination, on the basis of the current location of the vehicle, rather than on the basis of the driving direction to which to change, when the driving direction needs to be changed within a preset distance based on road information provided in a navigation mode.

Technical Solutions

A display device for a vehicle according to an embodiment of the present disclosure for accomplishing the above technical task includes a display unit and a controller configured to activate a navigation mode for guidance to a destination and to control the display unit to display a virtual item, indicating a driving direction to which to change, at a specific display angle when the driving direction needs to be changed within a preset distance based on road information provided in the navigation mode during travel of a vehicle to the destination. The controller controls a change in the display angle of the item on the basis of the angle of the driving direction to which to change.

In addition, a method of controlling a display device for a vehicle according to an embodiment of the present disclosure includes activating a navigation mode for guidance to a destination, determining whether a driving direction needs to be changed within a preset distance on the basis of road information provided in the navigation mode during travel of a vehicle to the destination, and displaying a virtual item, indicating the driving direction to which to change, at a specific display angle according to a result of the determining. The display angle of the item is changed based on the driving direction of the vehicle before change and the angle of the driving direction to which to change.

Advantageous Effects

According to one embodiment among various embodiments of the present disclosure, a driving direction to which to change while a vehicle is traveling is displayed to a user on the basis of the current location of the vehicle, rather than on the basis of the driving direction to which to change, thereby enabling the user to rapidly and conveniently reach a destination.

BEST MODE FOR DISCLOSURE

Figure 1:
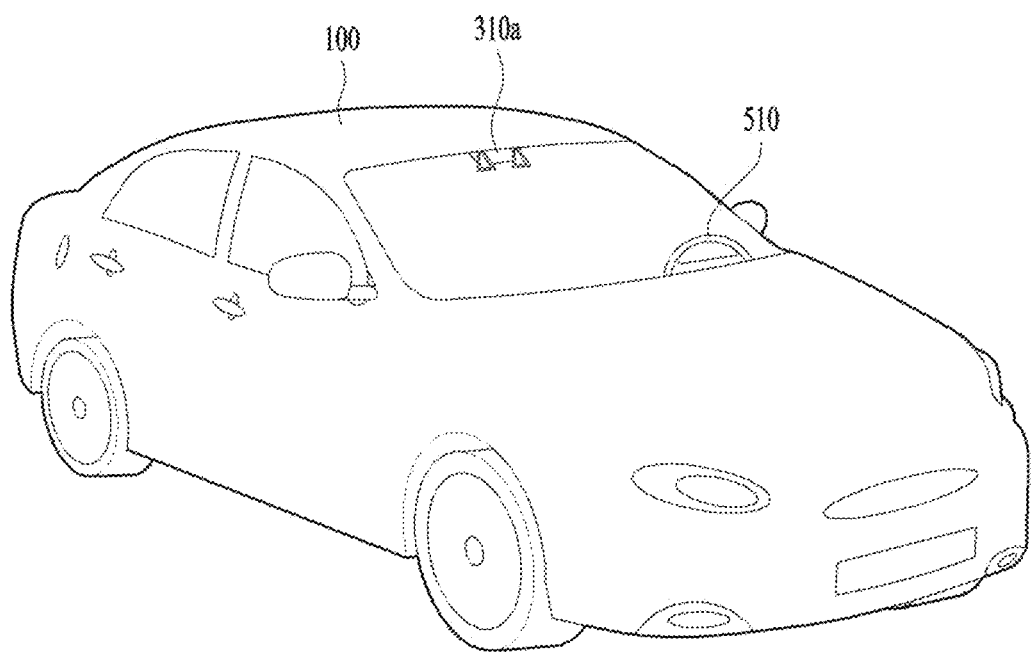
FIG. 1 is a view illustrating the external appearance of a vehicle according to an embodiment of the present disclosure.
Figure 1:
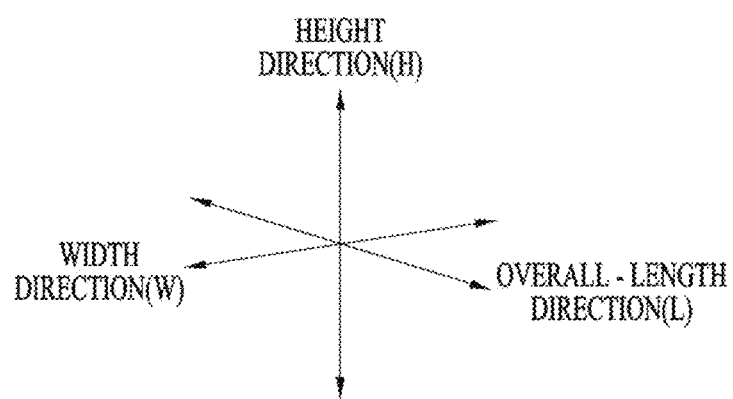

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a view of the external appearance of a vehicle according to an embodiment of the present disclosure.

Figure 2:
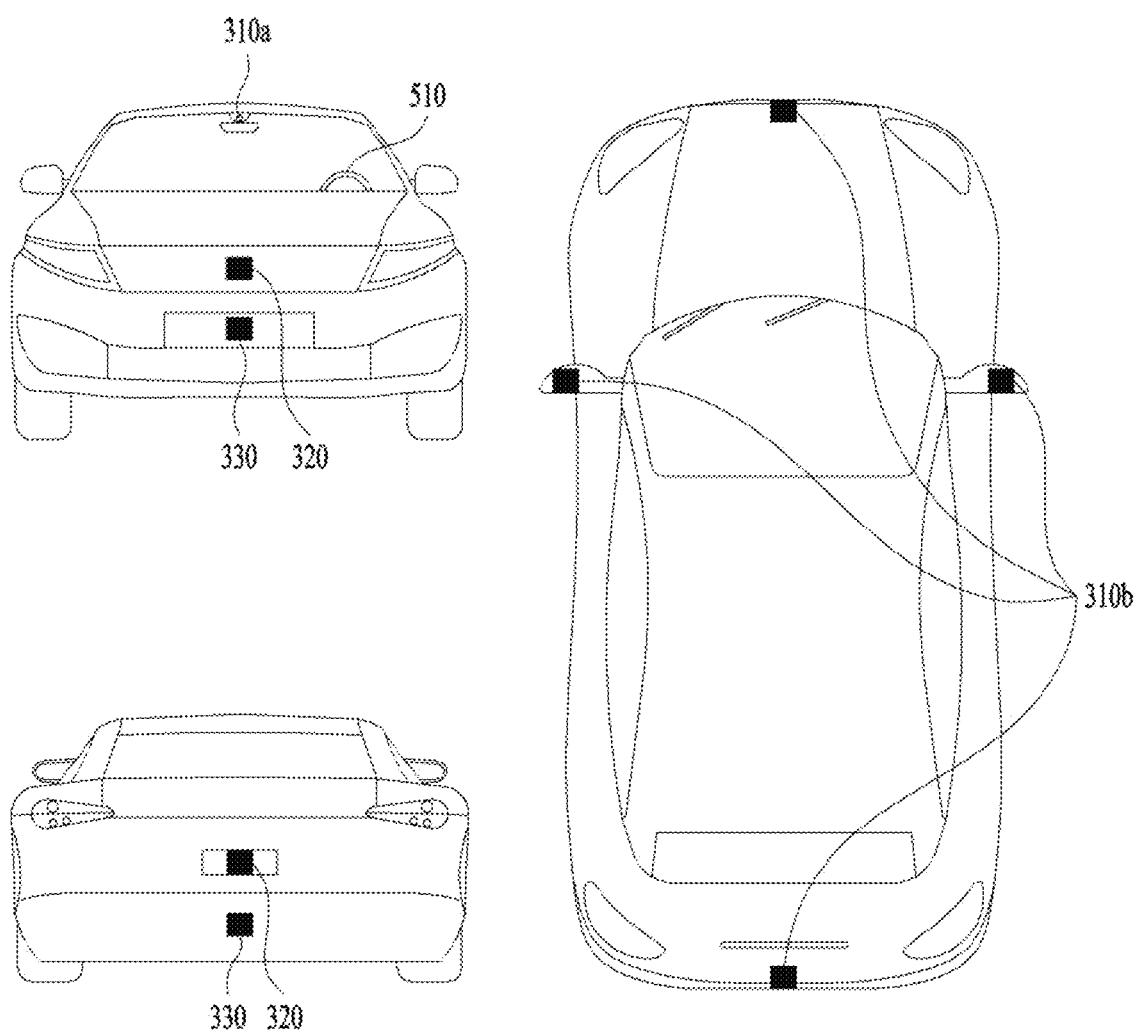
FIG. 2 is different angled views of the external appearance of a vehicle according to an embodiment of the present disclosure.

FIG. 2 is different angled views of a vehicle according to an embodiment of the present disclosure.

Figure 3:
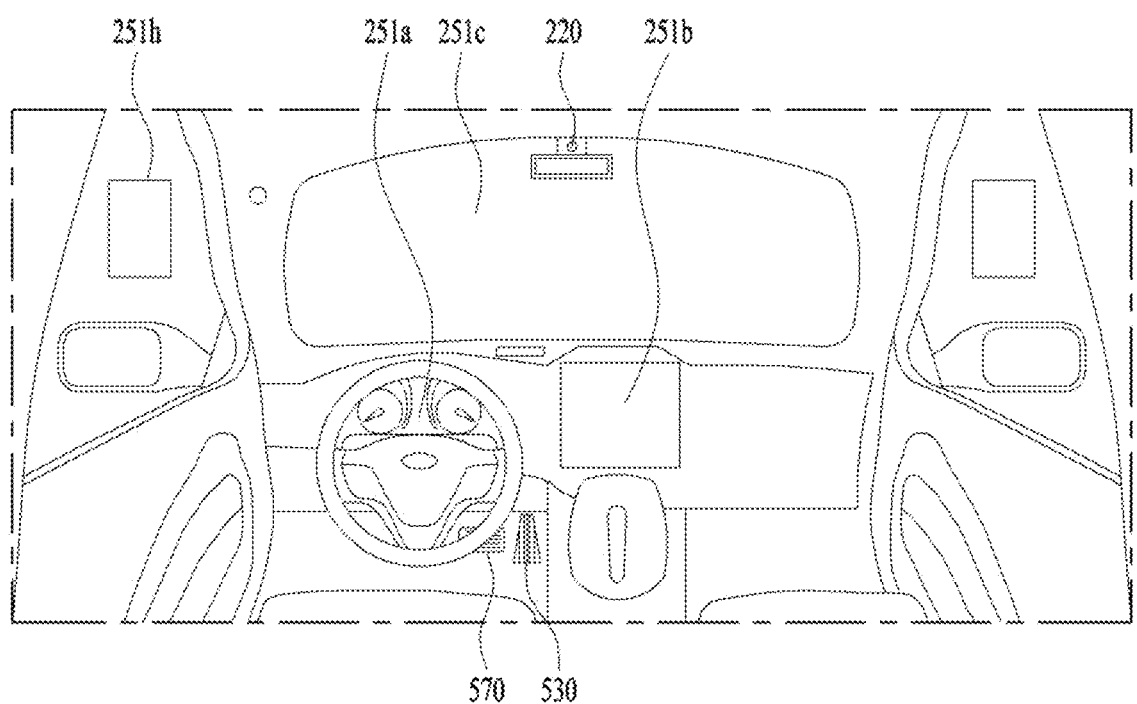
FIGS. 3 and 4 are views illustrating the interior configuration of a vehicle according to an embodiment of the present disclosure.
Figure 4:
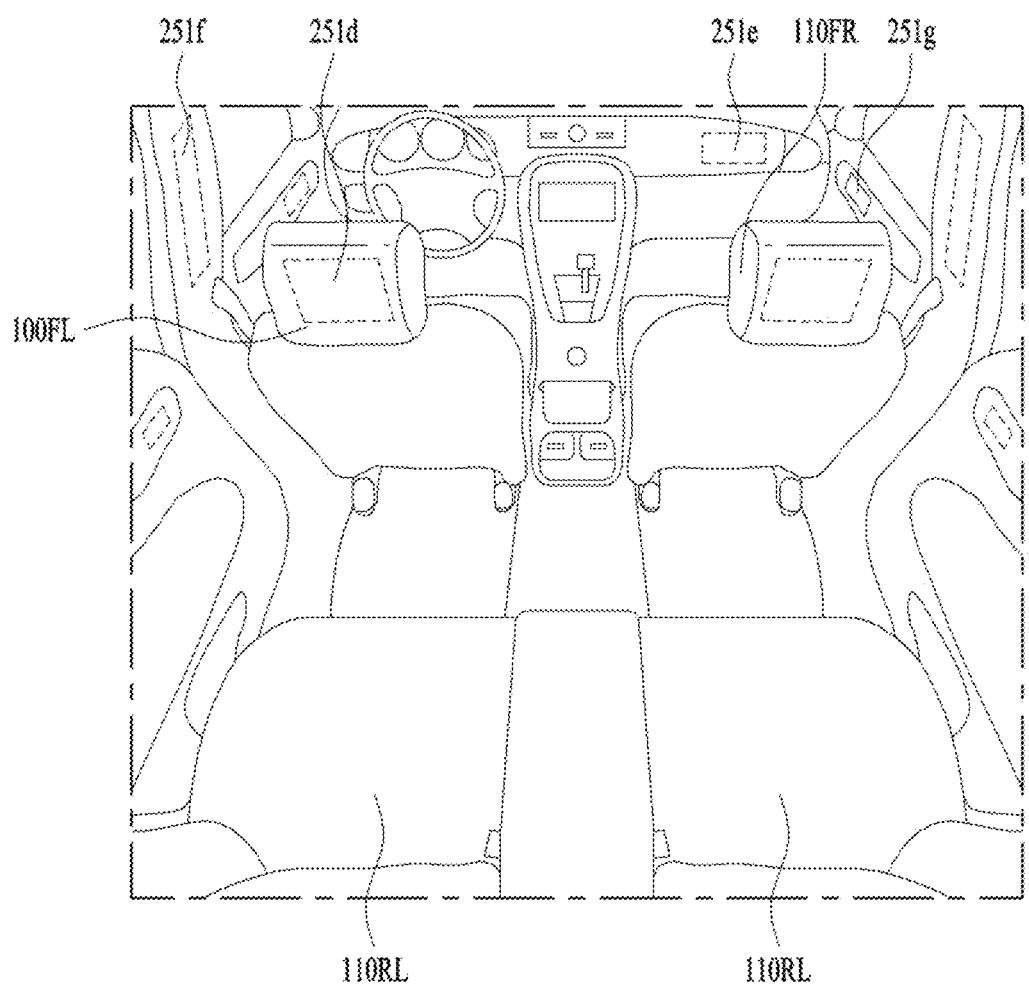

FIGS. 3 and 4 are views of the internal configuration of a vehicle according to an embodiment of the present disclosure.

Figure 5:
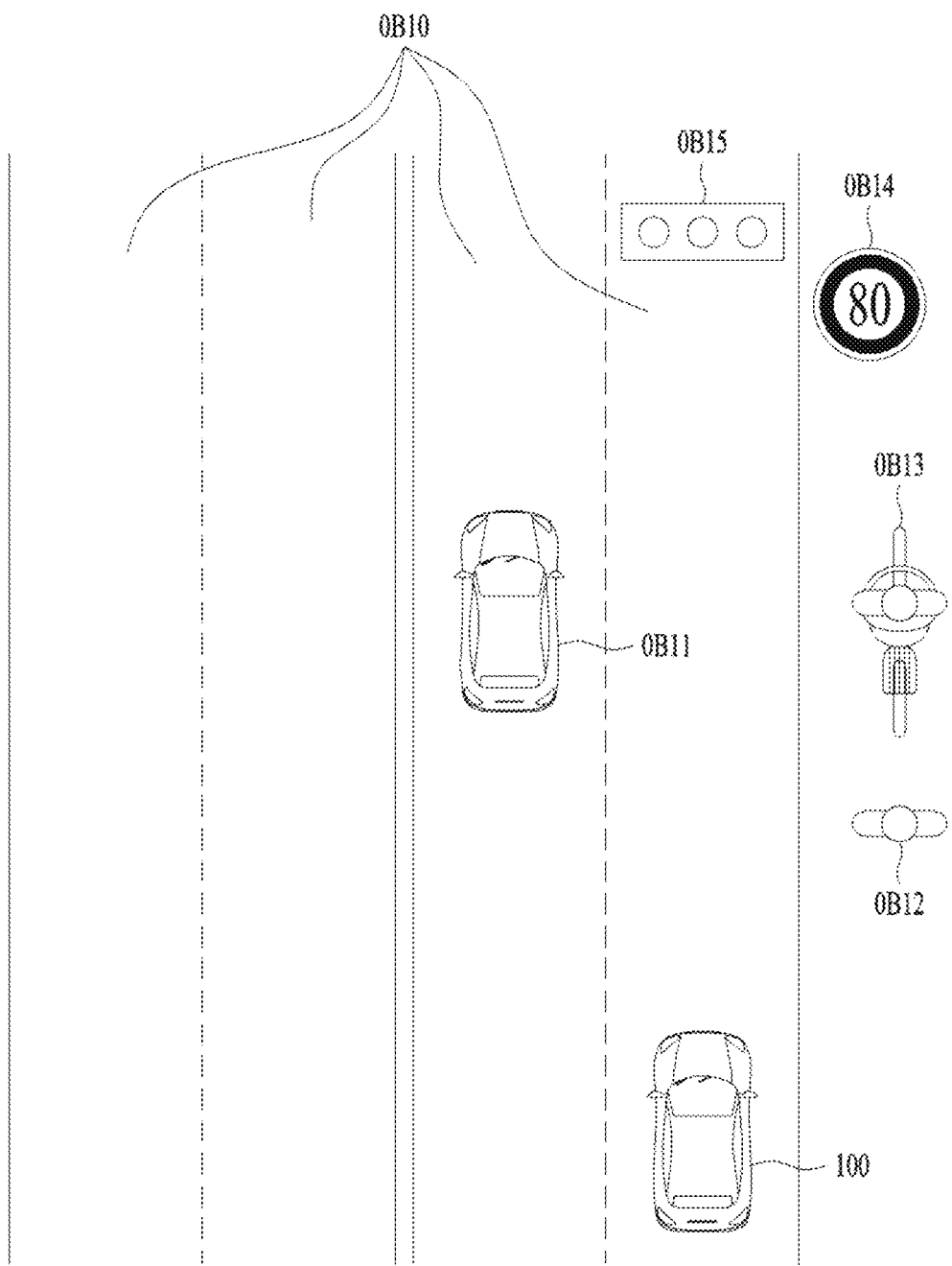
FIGS. 5 and 6 are views illustrating an object according to an embodiment of the present disclosure.
Figure 6:
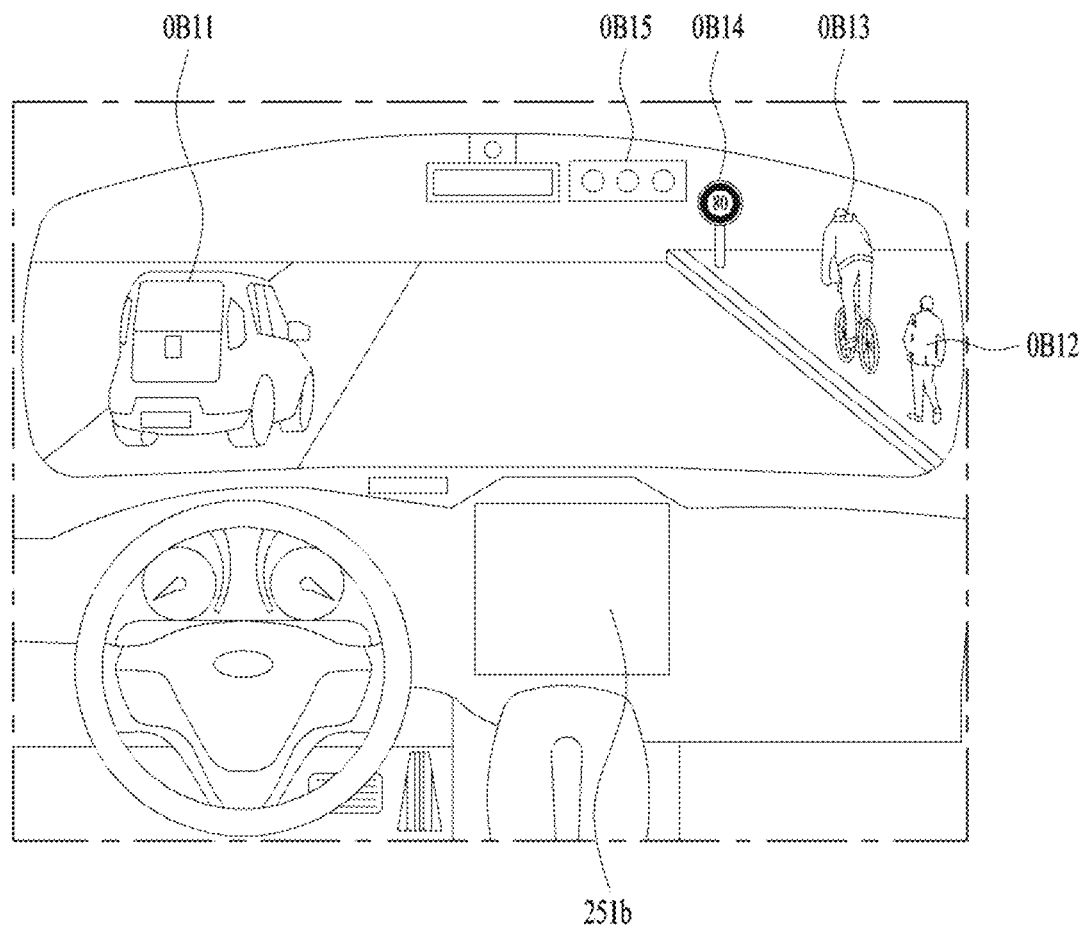

FIGS. 5 and 6 are views for explanation of objects according to an embodiment of the present disclosure.

Figure 7:
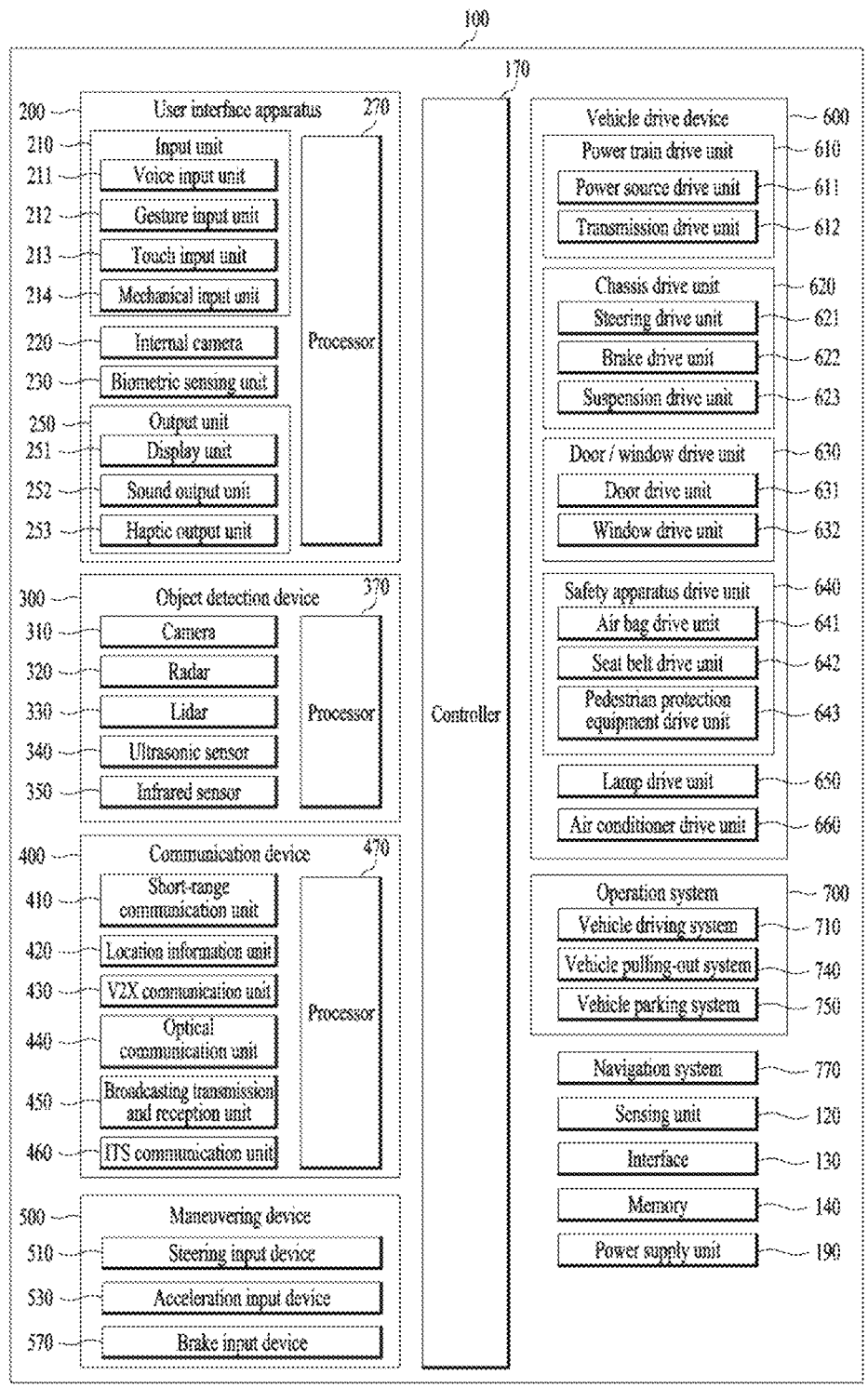
FIG. 7 is a block diagram illustrating a vehicle according to an embodiment of the present disclosure.

FIG. 7 is a block diagram illustrating a vehicle according to an embodiment of the present disclosure.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous mode or a manual mode in response to a user input.

For example, in response to a user input received through a user interface device 200, the vehicle 100 may be switched from a manual mode to an autonomous mode, or vice versa.

The vehicle 100 may be switched to the autonomous mode or to the manual mode based on driving environment information.

The driving environment information may include at least one of the following: information on an object outside a vehicle, navigation information, and vehicle state information.

For example, the vehicle 100 may be switched from the manual mode to the autonomous mode, or vice versa, based on driving environment information generated by the object detection device 300.

In another example, the vehicle 100 may be switched from the manual mode to the autonomous mode, or vice versa, based on driving environment information received through a communication device 400.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700.

For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components. The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Further, each of the sensing unit 120, the interface unit 130, the memory 140, the power supply unit 190, the user interface device 200, the object detection device 300, the communication device 400, the maneuvering device 500, the vehicle drive device 600, the operation system 700, and the navigation system 770 may have an individual processor or may be incorporated in the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some embodiments, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a time of flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a head up display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface device 200 may include a plurality of display units 251a to 251g.

The display unit 251 may be disposed in a region of a steering wheel, a region 251a, 251b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200.

In some embodiments, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100.

Meanwhile, the user interface device 200 may be referred to as a display device for a vehicle.

The user interface device 200 may operate under control of the controller 170.

The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

Meanwhile, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370. Each component of the object detection device may be separated from or integrated with the sensing unit, structurally or operatively.

In some embodiments, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an around view monitoring (AVM) camera 310b, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310a.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detect or classify an object by comparing data sensed by the camera 310, the radar 320, the lidar 330, the ultrasonic sensor 340, and the infrared sensor 350 with pre-stored data.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310*a*.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the lidar 330, the ultrasonic sensor 340, and the infrared sensor 350 in the memory 140.

Each step of the learning mode based on analysis of stored data, and an operating mode following the learning mode will be described later in detail in relation to the operation system 700. According to an embodiment, the object detection device 300 may include a plurality of processors 370 or no processor 370. For example, the camera 310, the radar 320, the lidar 330, the ultrasonic sensor 340, and the infrared sensor 350 may include individual processors.

In a case where the object detection device 300 does not include the processor 370, the object detection device 300 may operate under control of the controller 170 or a processor inside the vehicle 100.

The object detection device 300 may operate under control of the controller 170.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some embodiments, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideB and (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The processor 470 may control the overall operation of each unit of the communication device 400.

In some embodiments, the communication device 400 may include a plurality of processors 470, or may not include the processor 470.

In a case where the communication device 400 does not include the processor 470, the communication device 400 may operate under control of the controller 170 or a processor of a device inside of the vehicle 100.

Meanwhile, the communication device 400 may implement a vehicle display device, together with the user interface device 200. In this case, the vehicle display device may be referred to as a telematics device or an audio video navigation (AVN) device.

The communication device 400 may operate under control of the controller 170.

The maneuvering device 500 is configured to receive a user input for driving the vehicle 100.

In the manual mode, the vehicle 100 may operate based on a signal provided by the maneuvering device 500.

The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive device 600 may further include other components in addition to the aforementioned components, or may not include some of the aforementioned components.

Meanwhile, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

Meanwhile, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

Meanwhile, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor.

The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750.

In some embodiments, the operation system 700 may further include other components in addition to the aforementioned components, or may not include some of the aforementioned component.

Meanwhile, the operation system 700 may include a processor. Each unit of the operation system 700 may include its own processor.

Meanwhile, the operation system 700 may control driving in the autonomous mode based on learning. In this case, the learning mode and an operating mode based on the premise of completion of learning may be performed. A description will be given below of a method of executing the learning mode and the operating mode by the processor of the operation system 700.

The learning mode may be performed in the aforedescribed manual mode. In the learning mode, the processor of the operation system 700 may learn a driving route and ambient environment of the vehicle 100.

The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the aforedescribed autonomous mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

According to an embodiment, the processor of the operation system 700 may drive the vehicle 100 along the learned driving route by controlling the operation system 710 in the operating mode.

According to an embodiment, the processor of the operation system 700 may pull out the vehicle 100 from the learned parking space by controlling the vehicle pulling-out system 740 in the operating mode.

According to an embodiment, the processor of the operation system 700 may park the vehicle 100 in the learned parking space by controlling the vehicle parking system 750 in the operating mode. Meanwhile, in some embodiments, in a case where the operation system 700 is implemented as software, the operation system 700 may be a subordinate concept of the controller 170.

Meanwhile, in some embodiments, the operation system 700 may be a concept including at least one selected from among the user interface device 200, the object detection device 300, the communication device 400, the vehicle drive device 600, and the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300.

The driving system 710 may perform driving of the vehicle 100 by providing a control signal to the vehicle drive device 600 in response to reception of a signal from an external device through the communication device 400.

Conceptually, the driving system 710 may be a system that drives the vehicle 100, including at least one of the user interface device 200, the object detection device 300, the communication device 400, the maneuvering device 500, the vehicle drive device 600, the navigation system 770, the sensing unit 120, or the controller 170.

The driving system 710 may be referred to as a vehicle driving control device.

The vehicle pulling-out system 740 may perform an operation of pulling the vehicle 100 out of a parking space.

The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

Conceptually, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device.

The vehicle parking system 750 may perform an operation of parking the vehicle 100 in a parking space.

The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

Conceptually, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device through the communication device 400.

In some embodiments, the navigation system 770 may be classified as an element of the user interface device 200.

Hereinafter, a process of displaying a virtual item indicating a driving direction of a vehicle, which is traveling to a destination, on the basis of the current location of the vehicle, rather than on the basis of the driving direction to which to change, when the driving direction needs to be changed within a preset distance based on road information provided in a navigation mode will be described in detail with reference to FIGS. 8 to 19.

In the following detailed description, the virtual item will be referred to as a "dynamic wall arrow (DWA)" for convenience of description.

In addition, all control operations of the controller 170 to be described below may be identically performed by the processor 270 of the user interface device 200, which includes the navigation system 770. In this case, the user interface device 200 including the navigation system 770 may become a display device for a vehicle according to the present disclosure. In some cases, the user interface device 200 may further include at least one of the components within the object detection device 300, the components within the communication device 400, the components of the maneuvering device 500, the components of the vehicle drive device 600, the components of the chassis drive unit 620, the components of the door/window drive unit 630, the components of the safety apparatus drive unit 640, the components of the operation system 700, the sensing unit 120, the interface unit 130, or the memory 140, which are shown in FIG. 7, or may receive or be provided with information or data required for an operation of the present disclosure from at least one of those listed above by making a request thereto.

Figure 8:
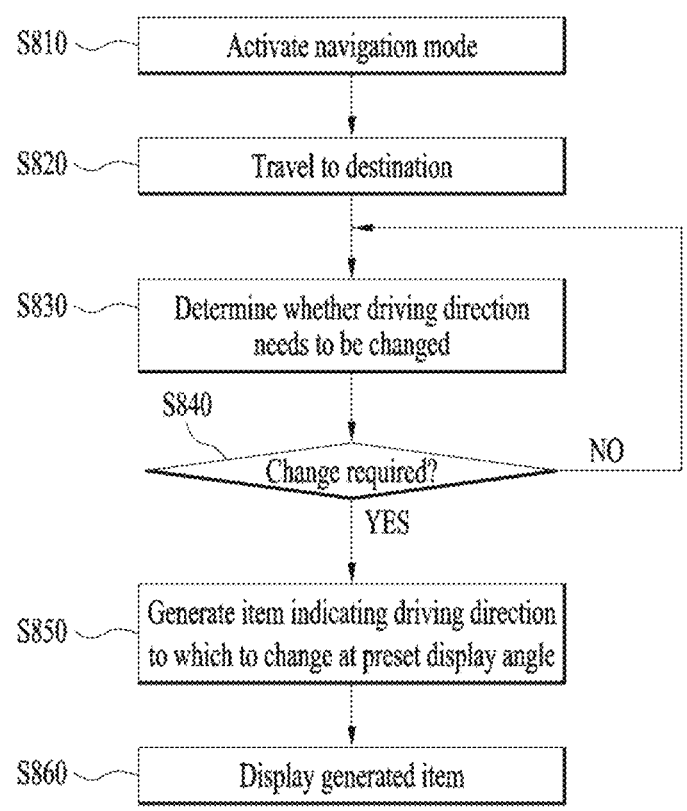
FIG. 8 is a flowchart for explaining a process of providing a DWA function of a display device for a vehicle according to an embodiment of the present disclosure.

FIG. 8 is a flowchart for explaining a process of providing a DWA function of a display device for a vehicle according to an embodiment of the present disclosure.

Referring to FIG. 8, the controller 170 of the vehicle 100 activates a navigation mode in response to a user command received through the input unit 210 [S810]. That is, the controller 180 activates the navigation mode in response to at least one of a voice command received through the voice input unit 211 of the input unit 210, a user gesture command received through the gesture input unit 211, a user touch gesture received through the touch input unit 213, or a user button input received through the mechanical input unit 214.

When a specific destination is set by the user through the input unit 210, the controller 170 acquires route information related to a route to the set destination on the basis of map information, which includes vehicle location information acquired through the location information unit 420 and road information acquired through the navigation system 770, and executes a navigation function of providing guidance along a route to the destination on the basis of the acquired route information.

When the vehicle starts traveling toward the destination [S820], the controller 170 determines whether the driving direction needs to be changed within a predetermined distance ahead of the vehicle in order to travel toward the destination on the basis of the map information, which includes current vehicle location information acquired through the location information unit 420 and road information acquired through the navigation system 770 [S830].

In this case, upon determining that at least one of at least one exit gate, at least one crossroads, at least one curved section, or at least one turning point is present within a predetermined distance ahead of the vehicle on the basis of the map information, which includes the current vehicle location information and the road information, the controller 170 may determine that the driving direction needs to be changed.

As described above, upon determining that the driving direction needs to be changed [S840], the controller 170 generates a DWA indicating the driving direction to which to change at a specific display angle [S850], and displays the generated DWA on the display unit 251 [S860]. The DWA may be generated in the form of augmented reality (AR).

In this case, the display unit 251 may include a head-up display (HUD), which displays the DWA on the windshield of the vehicle 100 by projecting the same thereon. In this case, the controller 170 may control the HUD to display the DWA on a region for displaying the driving direction to which to change within the windshield of the vehicle.

In addition, the display unit 251 may include a display device having a touch screen. In this case, the controller 170 may display a road image, received from the camera 310, on the screen of the display unit 251, and may display the DWA at a position for displaying the driving direction to which to change in the displayed road image.

Meanwhile, when displaying the DWA, the controller 170 changes the display angle of the DWA based on the angle between the driving direction of the vehicle before change and the driving direction to which to change. Thereby, the DWA accurately indicates the driving direction on the basis of the current location of the vehicle, rather than on the basis of the driving direction to which to change.

That is, when the angle between the driving direction of the vehicle before change and the driving direction to which to change is smaller than a predetermined angle (e.g. 35 degrees), the controller 170 may change the display angle of the DWA so that the DWA indicates the driving direction to which to change on the basis of the current location of the vehicle, rather than on the basis of the driving direction to which to change.

In one example, upon determining that the vehicle needs to enter an exit gate or enter at least one turning point within a predetermined distance ahead of the vehicle and that the angle between the driving direction of the vehicle and the exit gate or the turning point is smaller than a predetermined angle (e.g. 35 degrees) on the basis of map information, which includes current vehicle location information and information about the road on which the vehicle is traveling, the controller 170 may change the display angle of the DWA so that the DWA indicates the direction to which to change toward the exit gate or the turning point on the basis of the current location of the vehicle, rather than on the basis of the direction to which to change toward the exit gate or the turning point.

In another example, upon determining that the vehicle needs to enter a curved section within a predetermined distance ahead of the vehicle and that an angle at which the curved section is curved is larger than a predetermined angle on the basis of map information, which includes current vehicle location information and information about the road on which the vehicle is traveling, the controller 170 may change the display angle of the DWA so that the DWA indicates the direction in which the vehicle is to travel in the curved section on the basis of the current location of the vehicle, rather than on the basis of the curved section.

In still another example, upon receiving an image of the road on which the vehicle is traveling from the camera 310, upon recognizing the presence of a plurality of lanes in the road on the basis of the received road image, and upon determining that the vehicle needs to enter a curved section within a predetermined distance ahead of the vehicle and that an angle at which the curved section is curved is larger than a predetermined angle on the basis of map information, which includes current vehicle location information and information about the road on which the vehicle is traveling, the controller 170 may change the display angle of the DWA so that the DWA indicates the direction in which the vehicle is to travel in the curved section on the basis of the current location of the vehicle, rather than on the basis of the curved section.

In still another example, upon determining that a first turning point and a second turning point located subsequent to the first turning point are present within a predetermined distance ahead of the vehicle, that the distance between the first turning point and the second turning point is shorter than a predetermined distance, and that the vehicle has approached within a first distance from the first turning point on the basis of map information, which includes current vehicle location information and information about the road on which the vehicle is traveling, the controller 170 displays a first DWA, which indicates the direction in which the vehicle is to travel at the first turning point, on the first turning point.

Thereafter, in the state in which the first DWA is displayed and the vehicle has not reached the second turning point, upon determining that the vehicle has approached within a second distance from the first turning point, which is shorter than the first distance, the controller 170 may display a second DWA, which indicates the direction in which the vehicle is to travel at the second turning point, on the second turning point. In this case, the first DWA may be displayed in the form of a simple arrow indicating the first turning point, and the second DWA may be displayed on the lane corresponding to the second turning point in the form of augmented reality (AR).

In still another example, upon determining that a first turning point and a second turning point located subsequent to the first turning point are present within a predetermined distance ahead of the vehicle and that the vehicle has approached within a predetermined distance from the first turning point on the basis of map information, which includes current vehicle location information and information about the road on which the vehicle is traveling, the controller 170 may display a DWA, which indicates the direction in which the vehicle is to travel at the second turning point via the first turning point, on the first turning point and the second turning point. In this case, the DWA indicating the first turning point and the second turning point may have a shape into which a first DWA indicating the first turning point and a second DWA indicating the second turning point are integrated.

In still another example, as the vehicle approaches a point at which the driving direction thereof needs to be changed, the controller 170 may change the display size of the DWA indicating the driving direction to which to change on the basis of the current location of the vehicle.

That is, upon determining that the vehicle needs to enter a crossroads within a predetermined distance ahead of the vehicle on the basis of map information, which includes current vehicle location information and information about the road on which the vehicle is traveling, the controller 170 may display a DWA indicating the crossroads on the point corresponding to the crossroads on the basis of the current location of the vehicle, and then may gradually increase the size of the DWA as the vehicle approaches the crossroads.

Hereinafter, a DWA function according to the present disclosure will be described in detail with reference to FIGS. 9 to 19.

Figure 9:
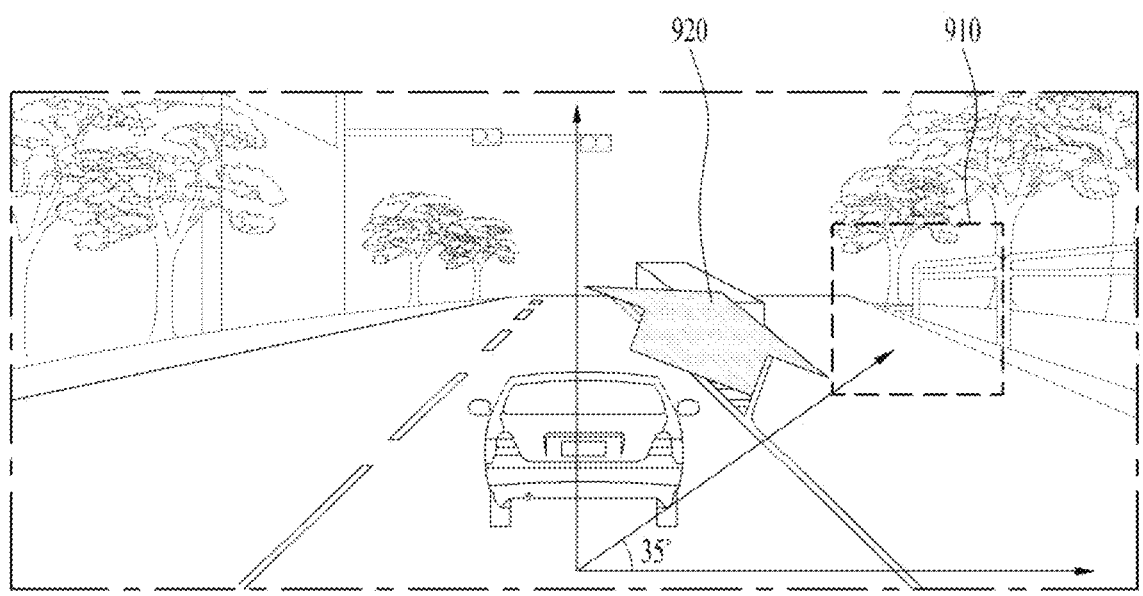
FIG. 9 is a diagram for explaining the situation in which a traveling vehicle needs to enter an exit gate.
Figure 10:
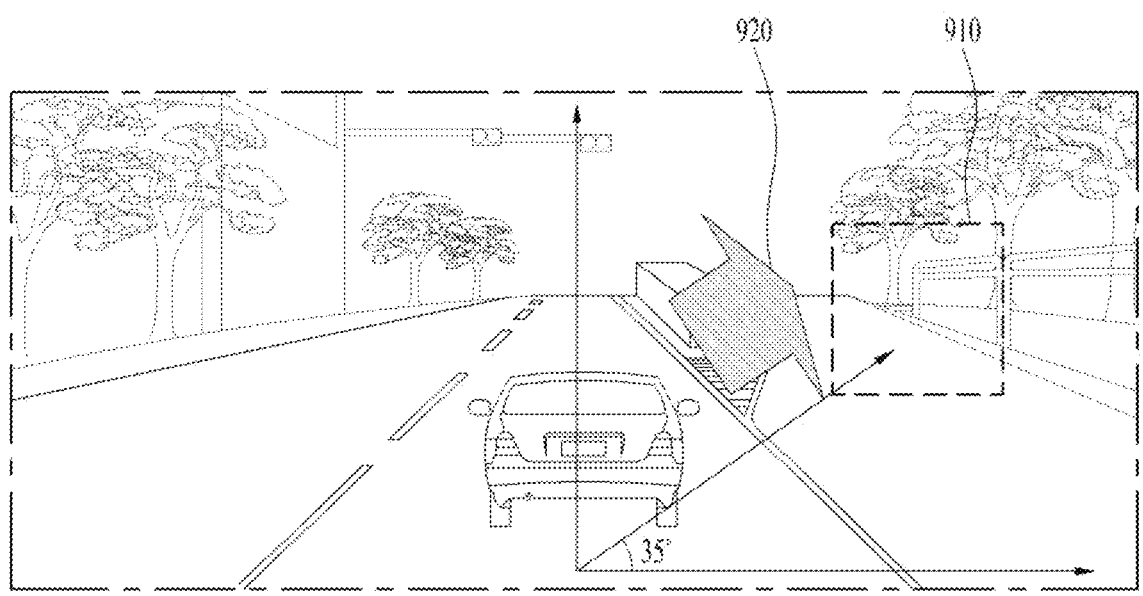
FIG. 10 is a diagram for explaining a process of displaying a DWA indicating the exit gate shown in FIG. 9 according to an embodiment of the present disclosure.

FIG. 9 is a diagram for explaining the situation in which a traveling vehicle needs to enter an exit gate, and FIG. 10 is a diagram for explaining a process of displaying a DWA indicating the exit gate shown in FIG. 9 according to an embodiment of the present disclosure.

First, referring to FIG. 9, in the state in which guidance along a route to a destination is provided to the vehicle in a navigation mode, when the vehicle needs to enter an exit gate 910 located within a predetermined distance ahead of the vehicle, a DWA 920 indicating the exit gate 910 is displayed near the exit gate 910.

Meanwhile, as shown in FIG. 9, when the angle of the direction toward the exit gate 910 on the basis of the current location of the traveling vehicle is smaller than a predetermined first angle (35 degrees), the vehicle may need to immediately turn to the right at the current location thereof in order to enter the exit gate 910. In this case, it is necessary for the DWA 920 to clearly indicate the rightward direction in order to help the user enter the exit gate 910 by immediately turning the vehicle to the right.

However, the DWA 920 shown in FIG. 9 indicates the exit gate 910 at a default angle at the current location of the traveling vehicle, rather than clearly indicating the rightward direction toward the exit gate 910. Thus, the user may be confused as to whether to enter the exit gate 910 or to enter the next exit gate in order to travel toward a destination.

Therefore, according to the present disclosure, as shown in FIG. 10, when the angle of the direction toward the exit gate 910 on the basis of the current location of the traveling vehicle is smaller than a predetermined first angle and the display angle of the DWA 920 is larger than the predetermined first angle, the controller 170 changes the display angle of the DWA 920 to the predetermined angle so that the DWA 920 clearly indicates the direction toward the exit gate 910. In one example, the first angle may be a minimum angle of 35 degrees.

In addition, when the angle of the direction toward the exit gate 910 on the basis of the current location of the traveling vehicle is smaller than a predetermined first angle (35 degrees) and the display angle of the DWA 920 is larger than the predetermined first angle but is smaller than a predetermined second angle, the controller 170 changes the display angle of the DWA 920 to the first angle, which is the minimum angle, so that the DWA 920 clearly indicates the direction toward the exit gate 910.

Meanwhile, the second angle may be 70 degrees to 80 degrees. The first and second angles may be changed according to user setting. In one example, the controller 170 may display a user interface enabling a change in at least one of the first angle or the second angle on the display unit 251, and the user may set each of the first and second angles to a desired angle using the user interface.

Meanwhile, after the display angle of the DWA 920 is changed, the controller 170 may display information about the exit gate 910 within the DWA 920. The information about the exit gate 910 may include at least one of the name of the exit gate 910, the remaining distance from the exit gate 910 to a destination, the remaining distance and the direction from the exit gate 910 to the next exit gate or turning point, or a fee that is required to be paid in order to pass through the exit gate 910.

In addition, the controller 170 may determine a predicted traveling lane in which the vehicle is to travel along the road on which the vehicle is currently traveling on the basis of information about a route to the destination provided in the navigation mode, and may further change the display angle of the DWA 920 on the basis of the determined predicted traveling lane and the angle of the direction toward the exit gate 910.

That is, the controller 170 may change the display angle of the DWA 920 based on whether the direction in which the predicted traveling lane in which the vehicle is to travel is oriented and the direction in which the DWA 920 indicating the exit gate 910 is oriented are the same as or different from each other.

In detail, in the state in which the direction in which the predicted traveling lane in which the vehicle is to travel is oriented and the direction in which the DWA 920 indicating the exit gate 910 is oriented are the same as each other, when the predicted traveling lane is the lane, among the lanes of the road, that is closest to the exit gate 910, the controller 170 may change the display angle of the DWA 920 to the first angle or more.

In one example, when the exit gate 910 is located on the rightmost side of the road, when the road is a road curved to the right, and when the predicted traveling lane of the vehicle is the rightmost lane of the road curved to the right, the direction in which the predicted traveling lane of the vehicle is oriented and the direction in which the DWA 920 indicating the exit gate 910 is oriented may be the same as each other.

In this case, since the vehicle is capable of immediately entering the exit gate 910 from the rightmost lane without changing lanes, the controller 170 changes the display angle of the DWA 920 to a default display angle set in the navigation mode, or changes the same to the first angle or more. In addition, the controller 170 may change the display shape of the DWA 920 to an arrow that is curved to the right so as to indicate a section from the rightmost lane of the road to the exit gate 910.

In another example, when the direction in which the predicted traveling lane of the vehicle is oriented and the direction in which the DWA 920 indicating the exit gate 910 is oriented are the same as each other and when the display angle of the DWA 920 indicating the direction toward the exit gate 910 is equal to or larger than the first angle, the user may become confused with regard to the position of the exit gate 910.

Therefore, when the direction in which the predicted traveling lane of the vehicle is oriented and the direction in which the DWA 920 indicating the exit gate 910 is oriented are the same as each other and when the display angle of the DWA 920 indicating the direction toward the exit gate 910 is equal to or larger than the first angle, the controller 170 may change the length of the DWA 920 according to the distance between the predicted traveling lane of the vehicle in the road and the exit gate 910, thereby preventing the user from confusion with regard to the position of the predicted traveling lane of the vehicle and the position of the exit gate 910.

In detail, when the exit gate 910 is located on the rightmost side of the road, when the road is a road curved to the right, and when the predicted traveling lane of the vehicle is the leftmost lane of the road, the distance between the predicted traveling lane of the vehicle and the exit gate 910 is the longest, and thus the DWA 920 displayed by the controller 170 may have the longest length. In addition, when the predicted traveling lane of the vehicle is the rightmost lane of the road, the distance between the predicted traveling lane of the vehicle and the exit gate 910 is the shortest, and thus the DWA 920 displayed by the controller 170 may have the shortest length. That is, the controller 170 may change the length of the DWA 920 in proportion to the distance between the predicted traveling lane of the vehicle on the road and the exit gate 910. Accordingly, the user may intuitively recognize the position of the predicted traveling lane of the vehicle and the position of the exit gate 910 on the basis of the changed length of the DWA 920.

In addition, when the direction in which the predicted traveling lane of the vehicle is oriented and the direction in which the DWA 920 indicating the exit gate 910 is oriented are the same as each other and when the display angle of the DWA 920, indicating the direction toward the exit gate 910, is equal to or larger than the first angle, the controller 170 may restrict the maximum display angle of the DWA 920, indicating the exit gate 910, according to the distance between the predicted traveling lane of the vehicle on the road and the exit gate 910, thereby preventing the user from confusion with regard to the position of the predicted traveling lane of the vehicle and the position of the exit gate 910. In this case, the maximum display angle may be larger than the first angle and smaller than 90 degrees. That is, as the distance between the predicted traveling lane of the vehicle and the exit gate 910 increases, the maximum display angle of the DWA 920 may be reduced and may become closer to the first angle, and as the distance decreases, the maximum display angle of the DWA 920 may be increased and may become closer to the second angle.

In addition, when the direction in which the predicted traveling lane of the vehicle is oriented and the direction in which the DWA 920 indicating the exit gate 910 is oriented are the same as each other and when the display angle of the DWA 920 indicating the direction toward the exit gate 910 is equal to or larger than the first angle, the controller 170 may display virtual items indicating the position of the predicted traveling lane of the vehicle and the position of the exit gate 910 in addition to the DWA 920, thereby preventing the user from confusion with regard to the position of the predicted traveling lane of the vehicle and the position of the exit gate 910.

In still another example, in the state in which the direction in which the predicted traveling lane in which the vehicle is to travel is oriented and the direction in which the DWA 920 indicating the exit gate 910 is oriented are different from each other, when the predicted traveling lane is the lane located farthest away from the exit gate 910, among the lanes of the road, and when the distance from the current location of the vehicle to the exit gate 910 is longer than a predetermined distance, the controller 170 may perform control such that the DWA 920 indicates the direction in which the predicted traveling lane of the vehicle is oriented, rather than indicating the exit gate 910, thereby preventing the user from confusion with regard to the position of the predicted traveling lane of the vehicle and the position of the exit gate 910.

Figure 11:
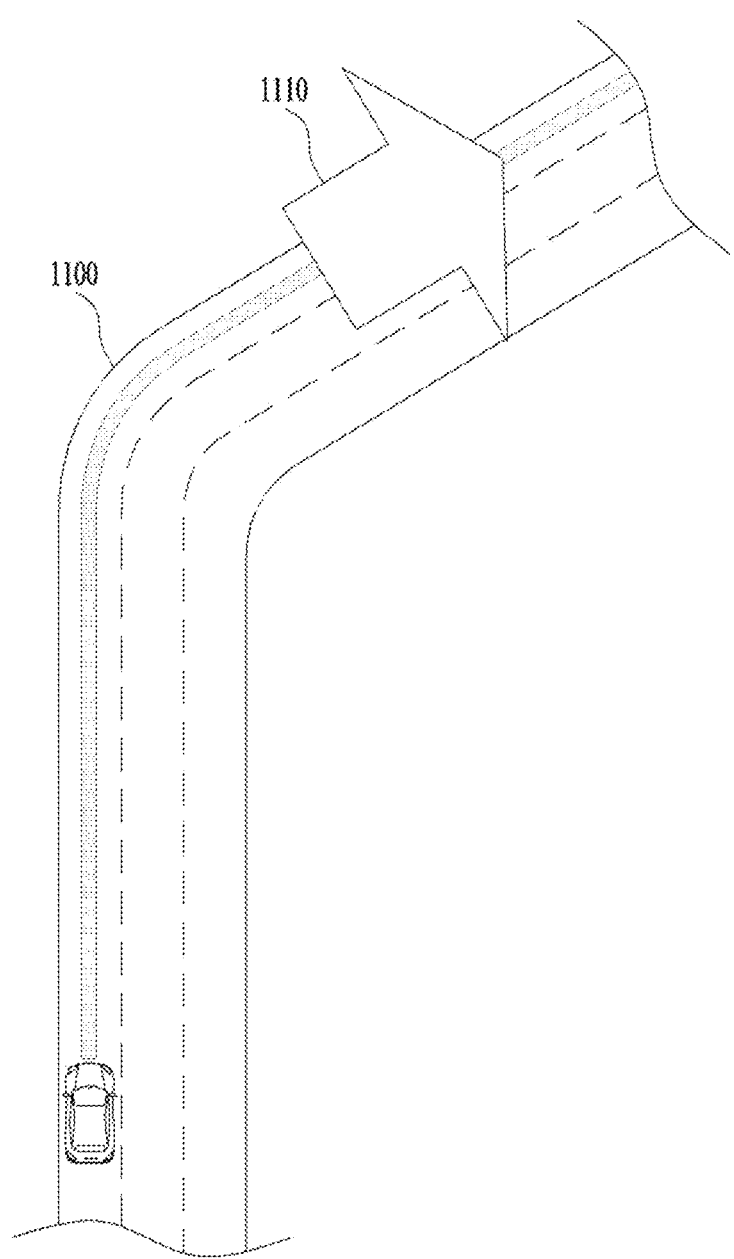
FIG. 11 is a diagram for explaining the situation in which a traveling vehicle needs to enter a curved section.
Figure 12:
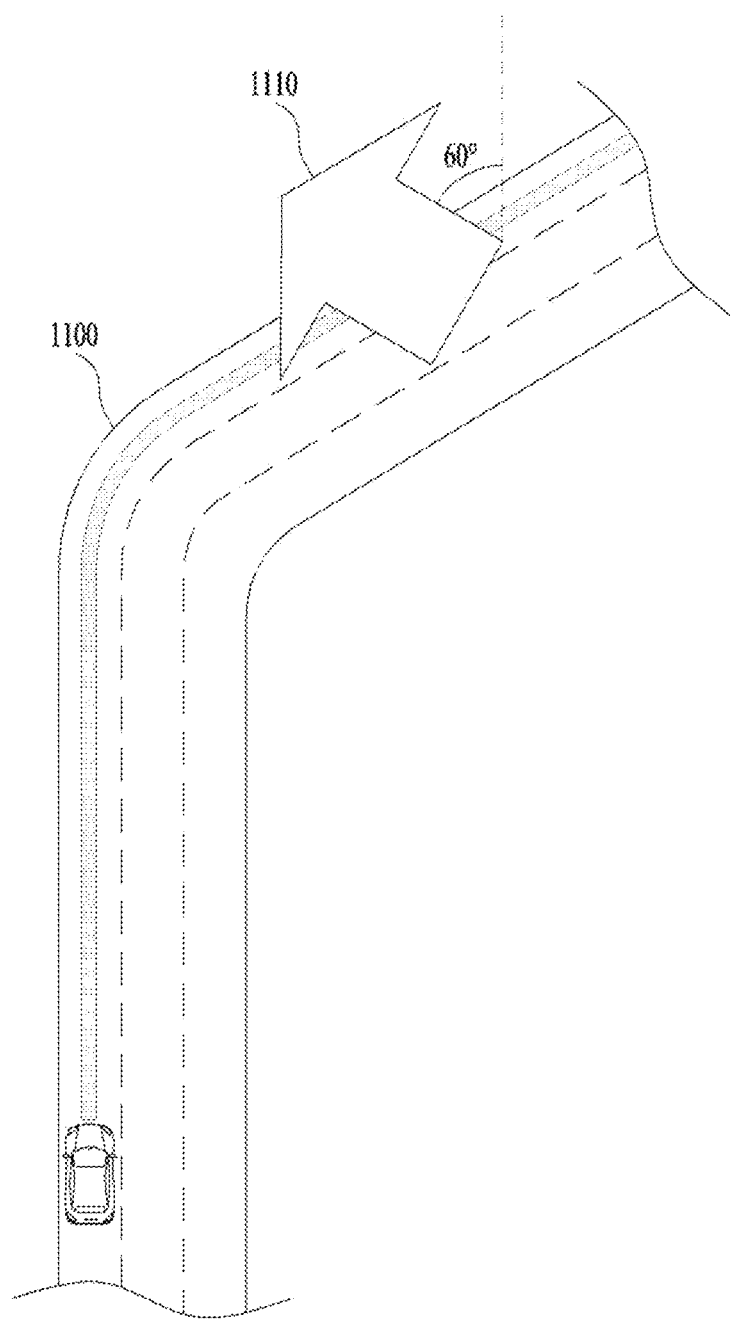
FIGS. 12 to 14 are diagrams for explaining a process of displaying a DWA indicating the driving direction of the vehicle in the curved section shown in FIG. 11 according to an embodiment of the present disclosure.
Figure 13:
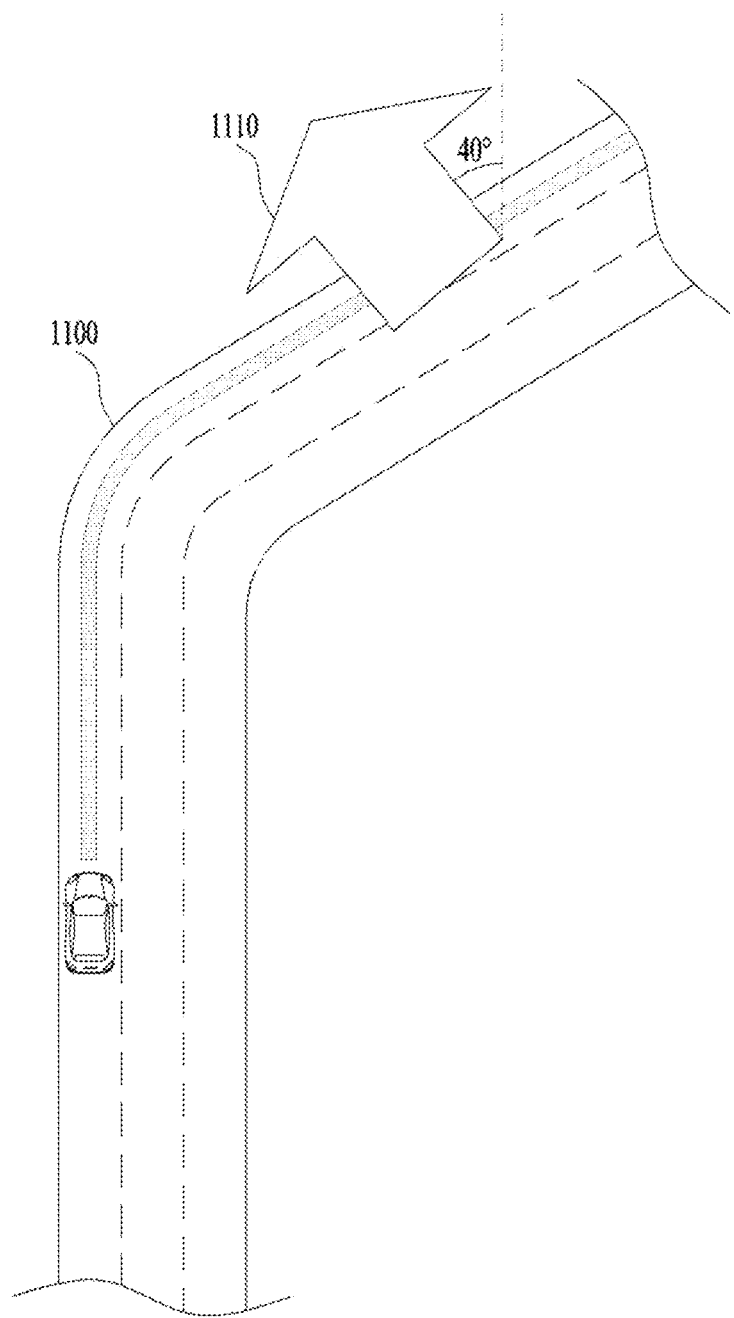
Figure 14:
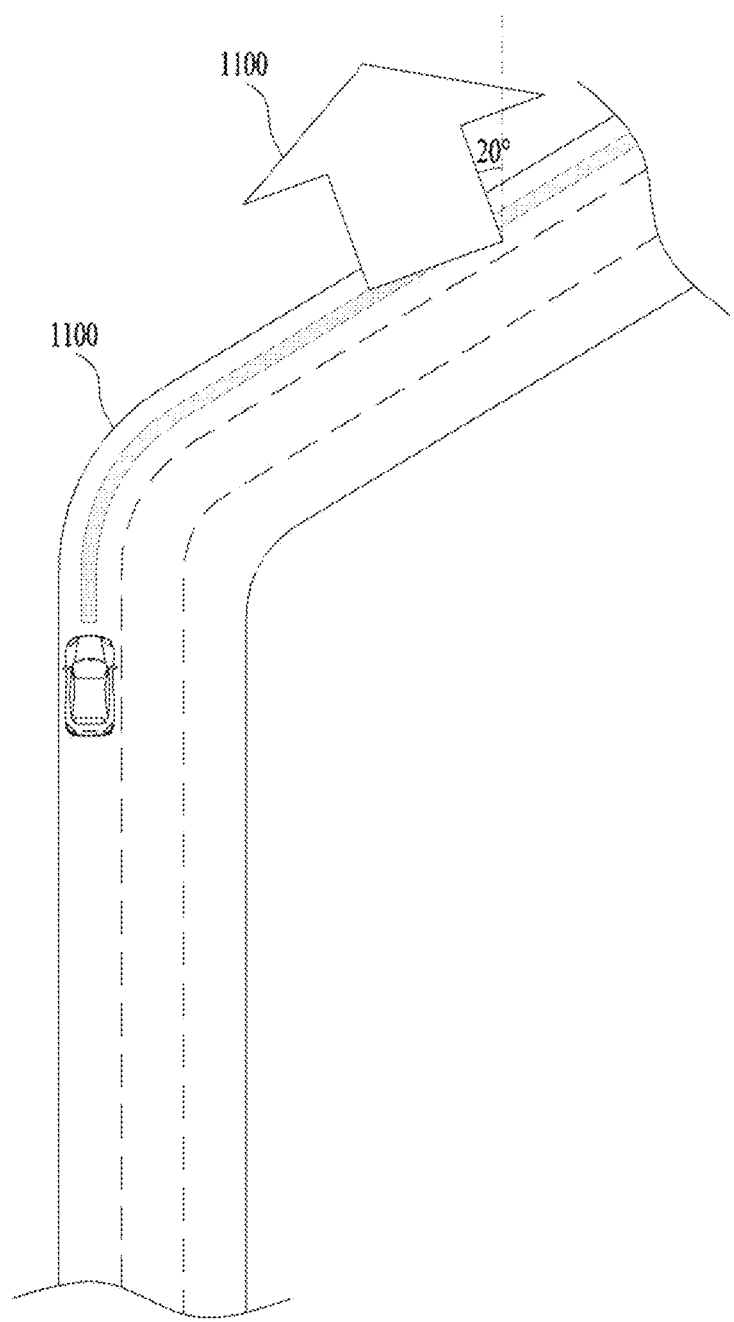

Next, FIG. 11 is a diagram for explaining the situation in which a traveling vehicle needs to enter a curved section, and FIGS. 12 to 14 are diagrams for explaining a process of displaying a DWA indicating the driving direction of the vehicle in the curved section shown in FIG. 11 according to an embodiment of the present disclosure.

First, referring to FIG. 11, in the situation in which guidance along a route to a destination is provided to the vehicle in a navigation mode, when the vehicle needs to enter a curved section 1100 located within a predetermined distance ahead of the vehicle, a DWA 1110 indicating the direction in which the vehicle is to travel in the curved section 1100 is displayed near the curved section 1110.

However, in the case shown in FIG. 11, the DWA 1110 indicates the direction in which the vehicle is to travel on the road of the curved section 1100 on the basis of the forward straight direction toward the curved section 1100, rather than on the basis of the location of the vehicle, thus confusing the user with regard to the direction in which the user is to drive the vehicle.

In one example, when the vehicle needs to travel along the first lane of the curved section 1100 that is curved to the right, it is necessary for the DWA 1110 to indicate the leftward direction on the basis of the location of the vehicle. However, referring to FIG. 11, the DWA 1110 indicates the direction in which the vehicle is to travel on the basis of the forward straight direction toward the curved section 1100. This DWA 1110 may confuse the user as to whether to remain in the first lane or to move the vehicle to a lane located to the right of the first lane.

In order to prevent this problem, as shown in FIGS. 12 to 14, when an angle at which the curved section 1100 is curved is larger than a predetermined angle, the controller 170 may change the display angle of the DWA 1110 so that the DWA 1110 indicates the direction in which the vehicle is to travel in the curved section 1100 on the basis of the current location of the vehicle, rather than on the basis of the curved section.

In this case, the controller 170 may display information about the curved section 1100 in the DWA 1110 after changing the display angle of the DWA 1110. The information about the curved section 1100 may include at least one of a lane in which the vehicle is to travel, among the lanes in the curved section 1100, the total length of the curved section 1100, an angle at which the curved section 1100 is curved, or the location of a traffic light present subsequent to the curved section 1100.

In this case, as shown in FIGS. 12 to 14 to be described below, the controller 170 may gradually reduce the display angle of the DWA 1110 as the vehicle approaches the curved section 1100.

That is, as shown in FIG. 12, when the vehicle approaches within a first distance from the curved section 1100, the controller 170 changes the display angle of the DWA 1110 to 60 degrees so that the DWA 1110 indicates the direction in which the vehicle is to travel in the curved section 1100 on the basis of the current location of the vehicle.

In addition, as shown in FIG. 13, when the vehicle approaches within a second distance from the curved section 1100, which is shorter than the first distance, the controller 170 changes the display angle of the DWA 1110 to 40 degrees so that the DWA 1110 indicates the direction in which the vehicle is to travel in the curved section 1100 on the basis of the current location of the vehicle.

In addition, as shown in FIG. 14, when the vehicle approaches within a third distance from the curved section 1100, which is shorter than the second distance, the controller 170 changes the display angle of the DWA 1110 to 20 degrees so that the DWA 1110 indicates the direction in which the vehicle is to travel in the curved section 1100 on the basis of the current location of the vehicle.

Figure 15:
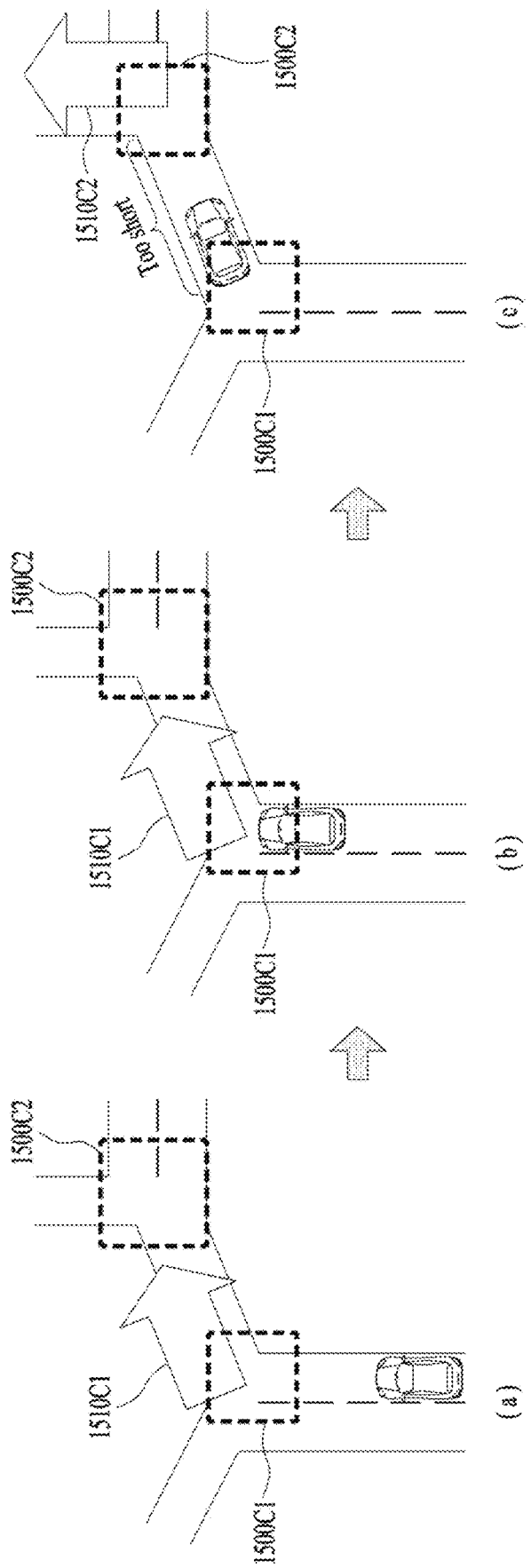
FIG. 15 is a diagram for explaining the situation in which a traveling vehicle needs to sequentially pass through first and second turning points.
Figure 16:
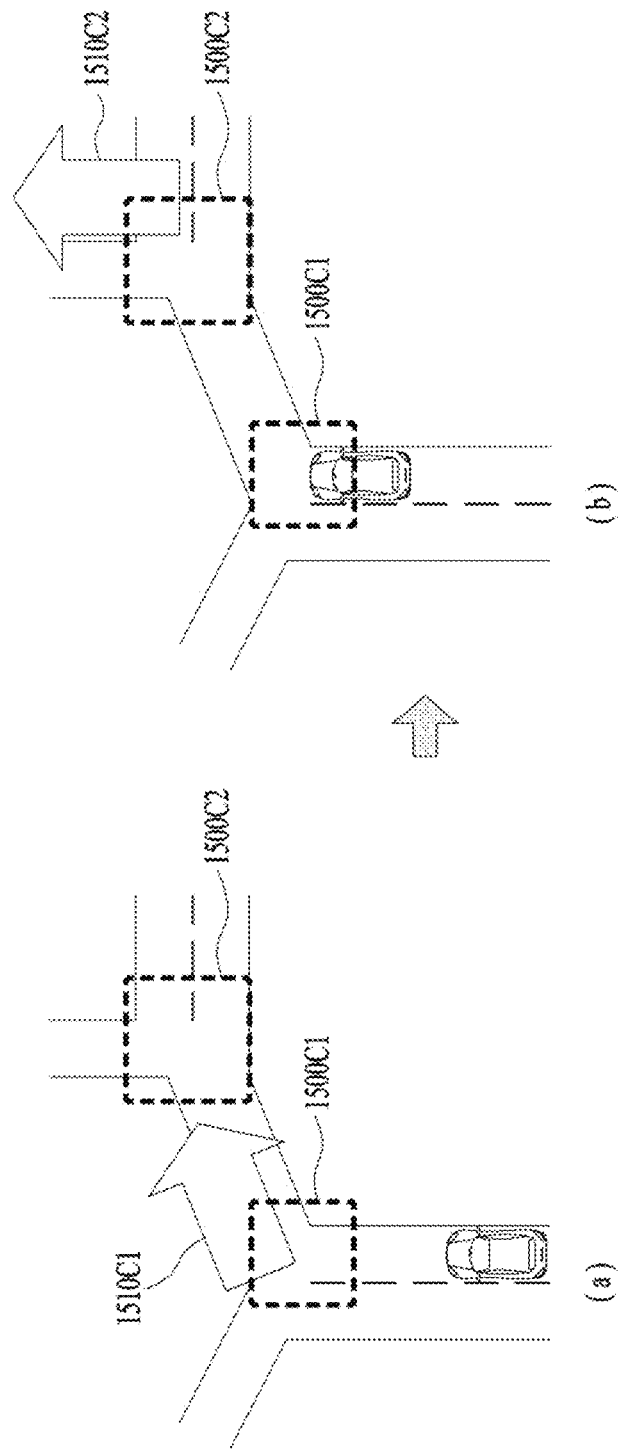
FIGS. 16 and 17 are diagrams for explaining a process of displaying a DWA indicating the driving direction of the vehicle at the first and second turning points shown in FIG. 15 according to an embodiment of the present disclosure.
Figure 17:
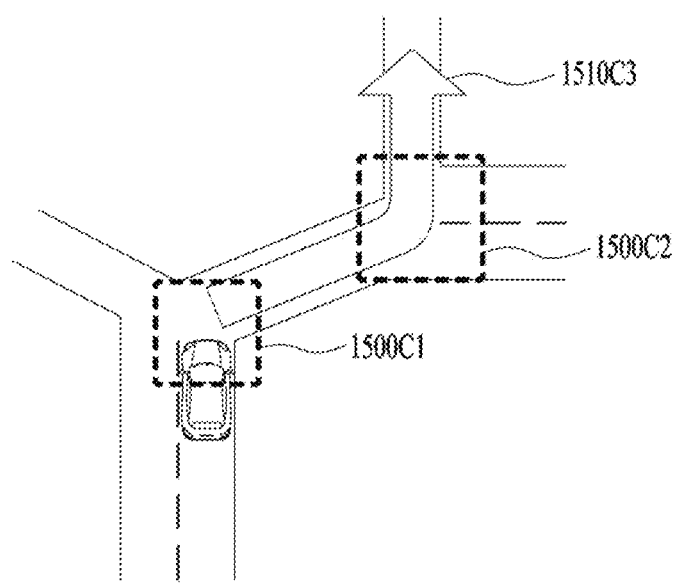

Next, FIG. 15 is a diagram for explaining the situation in which a traveling vehicle needs to sequentially pass through first and second turning points, and FIGS. 16 and 17 are diagrams for explaining a process of displaying a DWA indicating the driving direction of the vehicle at the first and second turning points shown in FIG. 15 according to an embodiment of the present disclosure.

First, as shown in FIG. 15(*a*), in the situation in which guidance along a route to a destination is provided to the vehicle in a navigation mode, when a first turning point 1500C1 and a second turning point 1500C2 located subsequent to the first turning point 1500C1 are present within a predetermined distance ahead of the vehicle and when the vehicle approaches the first turning point 1500C1, a first DWA 1510C1 indicating the direction in which the vehicle is to travel at the first turning point 1500C1 is displayed on the first turning point 1500C1.

Thereafter, as shown in FIGS. 15(*b*) and 15(*c*), when the vehicle approaches the second turning point 1500C2 after passing through the first turning point 1500C1, a second DWA 1510C2 indicating the direction in which the vehicle is to travel at the second turning point 1500C2 may be displayed on the second turning point 1510C2.

However, as shown in FIG. 15(*c*), when the distance between the first turning point 1500C1 and the second turning point 1500C2 is shorter than a predetermined distance, the first DWA 1510C1 and the second DWA 1510C2 may overlap each other, or the first DWA 1510C1 may be momentarily changed to the second DWA 1510C2, thus confusing the user with regard to the direction in which the user is to drive the vehicle.

In order to prevent this problem, as shown in FIG. 16(*a*), upon determining that the first turning point 1500C1 and the second turning point 1500C2 are present within a predetermined distance ahead of the vehicle and that the vehicle has approached within a first distance from the first turning point 1500C1 on the basis of map information, which includes current vehicle location information and information about the road on which the vehicle is traveling, the controller 170 displays the first DWA 1510C1, which indicates the direction in which the vehicle is to travel at the first turning point 1500C1, on the first turning point 1500C1.

Thereafter, as shown in FIG. 16(*b*), in the state in which the first DWA 1510C1 is displayed and the vehicle has not reached the second turning point 1500C2, upon determining that the vehicle has approached within a second distance from the first turning point 1500C1, which is shorter than the first distance, the controller 170 displays the second DWA 1510C2, which indicates the direction in which the vehicle is to travel at the second turning point 1500C2, on the second turning point 1500C2. That is, according to the present disclosure, in order to solve the problem shown in FIG. 15, when the vehicle arrives at the first turning point 1500C1 before reaching the second turning point 1500C2, the second DWA 1510C2 corresponding to the second turning point 1500C2 is displayed in advance.

In this case, the first DWA 1510C1 may be displayed in the form of a simple arrow indicating the first turning point, and the second DWA 1510C2 may be displayed on the lane corresponding to the second turning point in the form of augmented reality (AR).

In addition, each of the first and second DWAs 1510C1 and 1510C2 may include at least one of information about the remaining distance to a corresponding one of the first and second turning points 1500C1 and 1500C2, information about the name of the next place, or information about the remaining distance to the destination.

As another solution, as shown in FIG. 17, upon determining that the first turning point 1500C1 and the second turning point 1500C2 are present within a predetermined distance ahead of the vehicle and that the vehicle has approached within a predetermined distance from the first turning point 1500C1 on the basis of map information, which includes current vehicle location information and information about the road on which the vehicle is traveling, the controller 170 displays an integrated DWA 1510C3, which indicates the direction in which the vehicle is to travel at the second turning point 1510 via the first turning point 1500C1, in a region ranging from the first turning point 1500C1 to the second turning point 1500C2.

Figure 18:
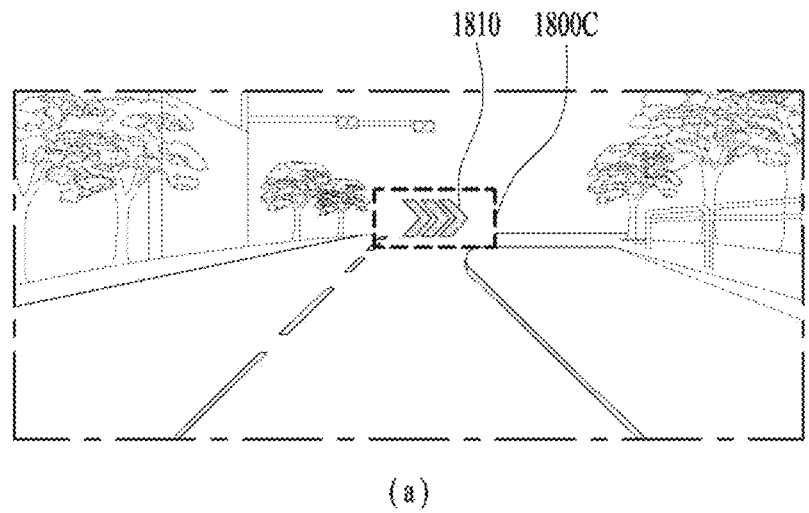
FIG. 18 is a diagram for explaining the situation in which a traveling vehicle needs to enter a crossroads.
Figure 18:
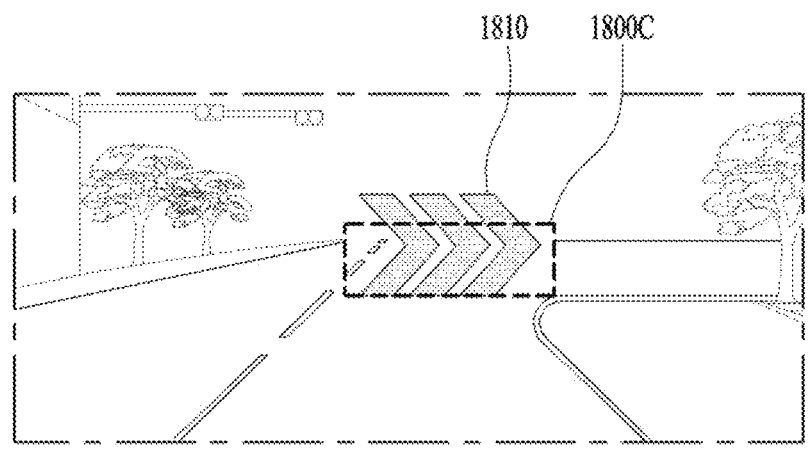
Figure 18:
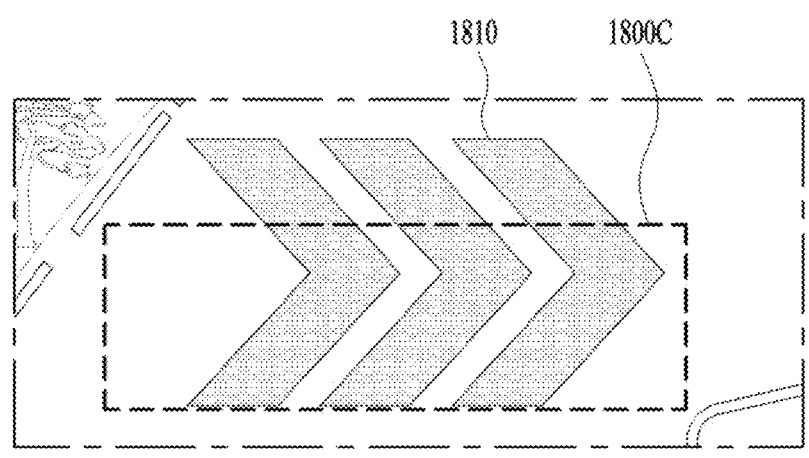
Figure 19:
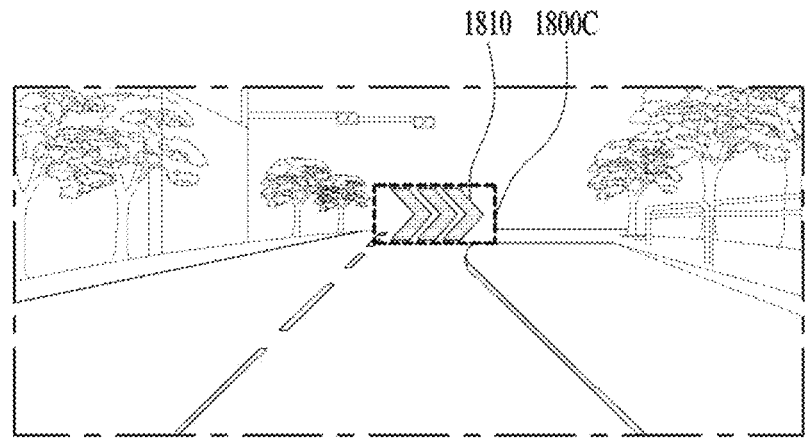
FIG. 19 is a diagram for explaining a process of changing the size of a DWA indicating the driving direction of the vehicle at the crossroads according to the distance between the crossroads shown in FIG. 18 and the vehicle approaching the same according to an embodiment of the present disclosure.
Figure 19:
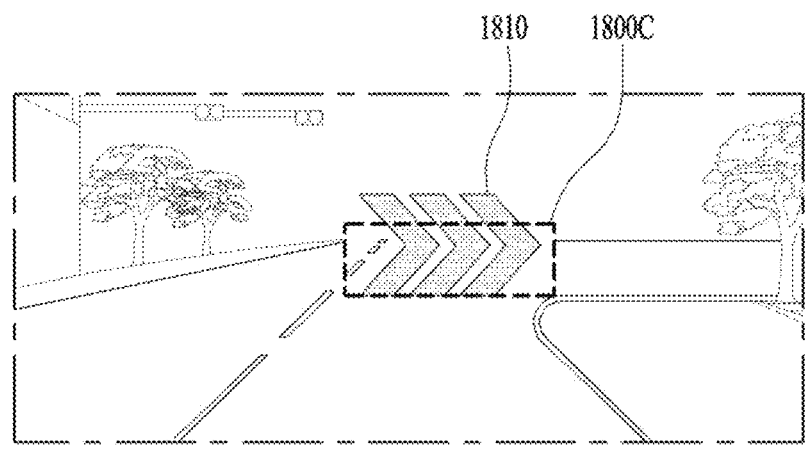
Figure 19:
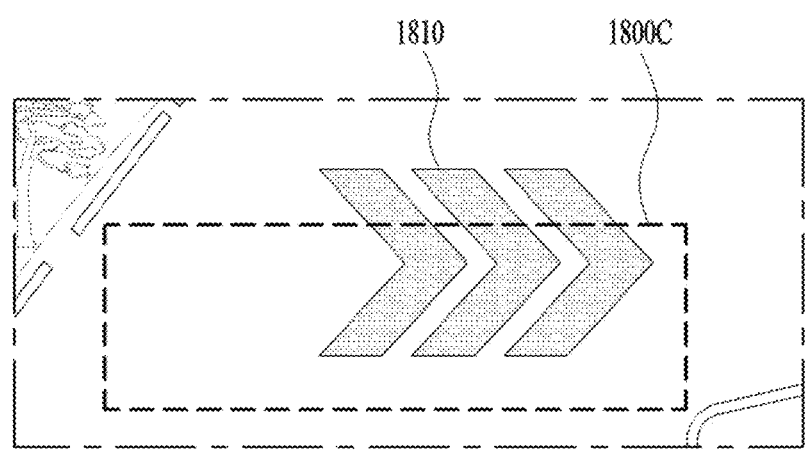

Finally, FIG. 18 is a diagram for explaining the situation in which a traveling vehicle needs to enter a crossroads, and FIG. 19 is a diagram for explaining a process of changing the size of a DWA indicating the driving direction of the vehicle at the crossroads according to the distance between the crossroads shown in FIG. 18 and the vehicle approaching the same according to an embodiment of the present disclosure.

First, as shown in FIG. 18(*a*), in the situation in which guidance along a route to a destination is provided to the vehicle in a navigation mode, when a crossroads 1800C is present within a predetermined distance ahead of the vehicle and when the vehicle approaches within a first distance (50 to 40 meters) from the crossroads 1800C, a DWA 1810 indicating the direction in which the vehicle is to travel at the crossroads 1800C is displayed at a first size on the crossroads 1800C.

Thereafter, as shown in FIG. 18(*b*), in the state in which the DWA 1810 is displayed at the first size, when the vehicle approaches the crossroads 1800C more closely, within a second distance (30 to 20 meters) from the crossroads, which is shorter than the first distance (40 meters), the DWA 1810 is displayed at a second size, which is larger than the first size, on the crossroads 1800C.

Thereafter, as shown in FIG. 18(*c*), in the state in which the DWA 1810 is displayed at the second size, when the vehicle approaches the crossroads 1800C still more closely, within a third distance (10 to 0 meters) from the crossroads, which is shorter than the second distance, the DWA 1810 is displayed at a third size, which is larger than the second size, on the crossroads 1800C.

As described above, as the vehicle approaches the crossroads 1800C, the size of the DWA 1810 is gradually increased. However, as shown in FIG. 18(*a*), the DWA 1810 that is displayed when the vehicle approaches within the first distance (50 to 40 meters) from the crossroads 1800C is too small, and is thus poorly visible. In addition, as shown in FIG. 18(*c*), the DWA 1810 that is displayed when the vehicle approaches within the third distance (10 to 0 meters) from the crossroads 1800C is too big.

In order to solve this problem, as shown in FIGS. 19(*a*) and 19(*b*), when the vehicle approaches within a fourth distance (50 to 20 meters) from the crossroads 1800C, which encompasses the first and second distances, the controller 170 displays the DWA 1810 indicating the direction in which the vehicle is to travel at the crossroads 1800C at the first size mentioned with reference to FIG. 18(*a*).

In addition, as shown in FIG. 19(*c*), when the vehicle approaches the crossroads 1800C more closely, within the third distance (10 to 0 meters) from the crossroads, the controller 170 changes the first size of the DWA 1810, indicating the direction in which the vehicle is to travel at the crossroads 1800C, to the second size mentioned with reference to FIG. 18(*b*).

As described above, the size of the DWA 1810 becomes larger than that shown in FIG. 18 when the vehicle is located a long distance from the crossroads 1800C, and becomes smaller than that shown in FIG. 18 when the vehicle is located a short distance from the crossroads 1800C, thereby enabling the user to easily recognize the DWA 1810.

It will be appreciated by those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display device for a vehicle, the display device comprising:
   a display unit; and
   a controller configured to activate a navigation mode for guidance to a destination and to control the display unit to display a virtual item having a specific display angle, indicating a driving direction to which to change when the driving direction needs to be changed within a preset distance based on road information provided in the navigation mode during travel of the vehicle to the destination,
   wherein, when an angle of the driving direction to which to change is smaller than a preset minimum angle and when the display angle of the virtual item is larger than the preset minimum angle, the controller controls the display unit to change the display angle of the virtual item to the preset minimum angle and to display the virtual item having the changed display angle, and
   wherein the controller changes a size of the virtual item based on a distance between the vehicle and a point at which the driving direction needs to be changed.

2. The display device of claim 1, wherein the display unit comprises a head-up display (HUD) configured to project the virtual item onto a windshield of the vehicle to display the virtual item, and
   wherein the controller controls the head-up display to display the virtual item on a region for display of the driving direction to which to change within the windshield.

3. The display device of claim 1, wherein the display unit displays an image of a road on which the vehicle is traveling, and
   wherein the controller controls the display unit to display the virtual item at a position for display of the driving direction to which to change in the image of the road.

4. The display device of claim 1, wherein, when at least one of at least one exit gate, at least one crossroads, at least one curved section, or at least one turning point is present within the preset distance, the controller determines that the driving direction needs to be changed.

5. The display device of claim 4, wherein the controller receives an image of a road on which the vehicle is traveling, and
   wherein, upon determining that a plurality of lanes is present in the road and that an angle of the at least one curved section is larger than a preset angle on a basis of the received image of the road, the controller changes the display angle of the virtual item so that the virtual item indicates a driving direction of the vehicle in the at least one curved section based on a current location of the vehicle, rather than based on the at least one curved section.

6. The display device of claim 4, wherein the at least one turning point comprises a first turning point and a second turning point located subsequent to the first turning point,
   wherein, upon determining that a distance between the first turning point and the second turning point is shorter than the preset distance and that the vehicle has approached within a first distance from the first turning point on a basis of the road information, the controller controls the display unit such that a first virtual item indicating a driving direction of the vehicle at the first turning point is displayed on the first turning point, and
   wherein, in a state in which the first virtual item is displayed and the vehicle has not reached the second turning point, upon determining that the vehicle has approached within a second distance from the first turning point, the second distance being shorter than the first distance, the controller controls the display unit such that a second virtual item indicating a driving direction of the vehicle at the second turning point is displayed on the second turning point.

7. The display device of claim 4, wherein the at least one turning point comprises a first turning point and a second turning point, and
   wherein, upon determining that a distance between the first turning point and the second turning point is shorter than the preset distance and that the vehicle has approached within the preset distance from the first turning point on a basis of the road information, the controller controls the display unit such that virtual items indicating driving directions of the vehicle at the first turning point and the second turning point are displayed on the first turning point and the second turning point.

8. The display device of claim 1, wherein the controller changes the size of the virtual item to a first size when the distance between the vehicle and the point at which the driving direction needs to be changed is shorter than a first distance, and changes the size of the virtual item to a second size when the distance between the vehicle and the point at which the driving direction needs to be changed is shorter than a second distance,
   wherein the first distance is longer than the second distance, and
   wherein the second size is larger than the first size.

9. A method of controlling a display device for a vehicle, the method comprising:
   activating a navigation mode for guidance to a destination;
   determining whether a driving direction needs to be changed within a preset distance on a basis of road information provided in the navigation mode during travel of the vehicle to the destination;
   displaying a virtual item having a specific display angle, indicating a driving direction to which to change according to a result of the determining; and
   changing the display angle of the virtual item to a preset minimum angle and displaying on a display unit the virtual item having the changed display angle when an angle of the driving direction to which to change is smaller than the preset minimum angle and when the display angle of the virtual item is larger than the preset minimum angle,
   wherein a size of the virtual item is changed based on a distance between the vehicle and a point at which the driving direction needs to be changed.

* * * * *